Inventor:
HARRY WEISBERG

BY W. S. Hill
Agent

Inventor:
HARRY WEISBERG
BY W. S. Hill
Agent

United States Patent Office 3,427,509

Patented Feb. 11, 1969

3,427,509

ASYMMETRICAL TRIGGERING DIODE COMPOSED OF THREE OPPOSITE CONDUCTIVITY REGIONS

Harry Weisberg, Forty Fort, Pa., assignor to Radio Corporation of America, a corporation of Delaware Filed Nov. 16, 1965, Ser. No. 508,028

U.S. Cl. 317—234 4 Claims

Int. Cl. H01l 3/00

ABSTRACT OF THE DISCLOSURE

Triggering diode having a negative resistance characteristic in the forward direction and a relatively low breakdown voltage in the back direction, comprising two outer relatively heavily doped layers of one conductivity type and a more lightly doped intermediate layer of opposite conductivity type wherein one of the two outer layers includes a relatively thin minor portion and the intermediate region has a correspondingly thicker portion.

This invention relates to a novel form of semiconductor diode and, more particularly, to an improved triggering diode with asymmetrical conducting properties.

Trigger circuits for controlling the operation of devices such as A-C motors, and which include a silicon controlled rectifier (SCR) as the switching element, have gone into widespread use. One such phase-control circuit, used for varying the speed of an A-C motor, includes a fixed resistor, a potentiometer, and a capacitor in series with a motor. An SCR is connected in shunt with the resistor, potentiometer and capacitor, and the gate electrode of the SCR is connected to one electrode of a neon bulb, the other electrode of which is connected to a point between the potentiometer and the capacitor.

In operation, as the SCR anode voltage increases, current flows through the resistor and potentiometer causing capacitor voltage to increase. During this time the neon bulb is in its high impedance state so that very little current flows through the gate of the SCR. When the capacitor voltage reaches the firing voltage of the neon bulb, the neon bulb switches to a low impedance state, that is, it develops a negative resistance so that voltage across it decreases while current through it increases. This sudden drop in voltage across the neon bulb allows the capacitor to partially discharge so that it sends a pulse of current through the gate of the SCR to trigger the SCR to the conducting state.

In the type of controlled rectifier circuit described above, the quantity of charge available for the gate pulse is equal to capacitance of the capacitor multiplied by the change in voltage across the neon bulb when it goes from its high impedance state to its low impedance state. In order to utilize as small a capacitor as possible, it is desirable to have the voltage change as large as possible and, in fact, larger than can be obtained with the usual neon bulb.

It is also desirable to have a lower discharge voltage than can be obtained with the usual neon bulb while still maintaining a useful voltage difference between the high impedance state and the low impedance state. A lower discharge voltage would allow the controlled rectifier to be fired closer to the beginning of each cycle of A-C. Also, with a lower discharge voltage, lower voltage trigger circuit components could be used with a resulting savings in cost.

The trigger circuit controls used to control the speed of a variable speed A-C motor used for driving an electric hand drill, for example, must fit into a very compact space. It is desirable to be able to reduce the size of any of the components presently used.

Trigger circuits using neon bulbs have the disadvantage that neon bulb characteristics often change with time, giving the bulb a limited operating life. In addition, triggering characteristics of a neon bulb are affected by factors such as ambient light and nearby electric fields.

One object of the present invention is to provide a novel solid state device having many possible uses, one of which is to replace the neon bulb in trigger circuits for controlled rectifiers. More specific objects are to provide an improved triggering device which has smaller size, greater reliability, longer operating life, lower breakover voltage, and greater voltage change between the high impedance state and the low impedance state than a neon bulb.

The device structure comprises a semiconductor body including two outer regions of one type conductivity, and an intermediate region of opposite type conductivity. The two outer regions are doped relatively heavier than the intermediate region. One of the outer regions has a major portion of substantially uniform thickness and at least one minor portion which is relatively much thinner than the major portion. The intermediate region is correspondingly thicker where the one outer region is relatively thinner. An ohmic electrode is attached to both the major and minor portions of the one outer region.

The device may function as a triggering diode which has asymmetrical conducting properties. That is, its conducting characteristics are different in one direction than in the opposite direction. When biased in the forward direction, the device conducts only slightly until a certain breakover voltage is reached. At this point the device exhibits negative resistance and passes a relatively higher current. When biased in the back direction, the device exhibits relatively lower voltage breakdown but no negative resistance.

One embodiment of the invention is illustrated in the drawing, of which:

Figures 1, 2A, 2B, 2C, 2D, 2E:
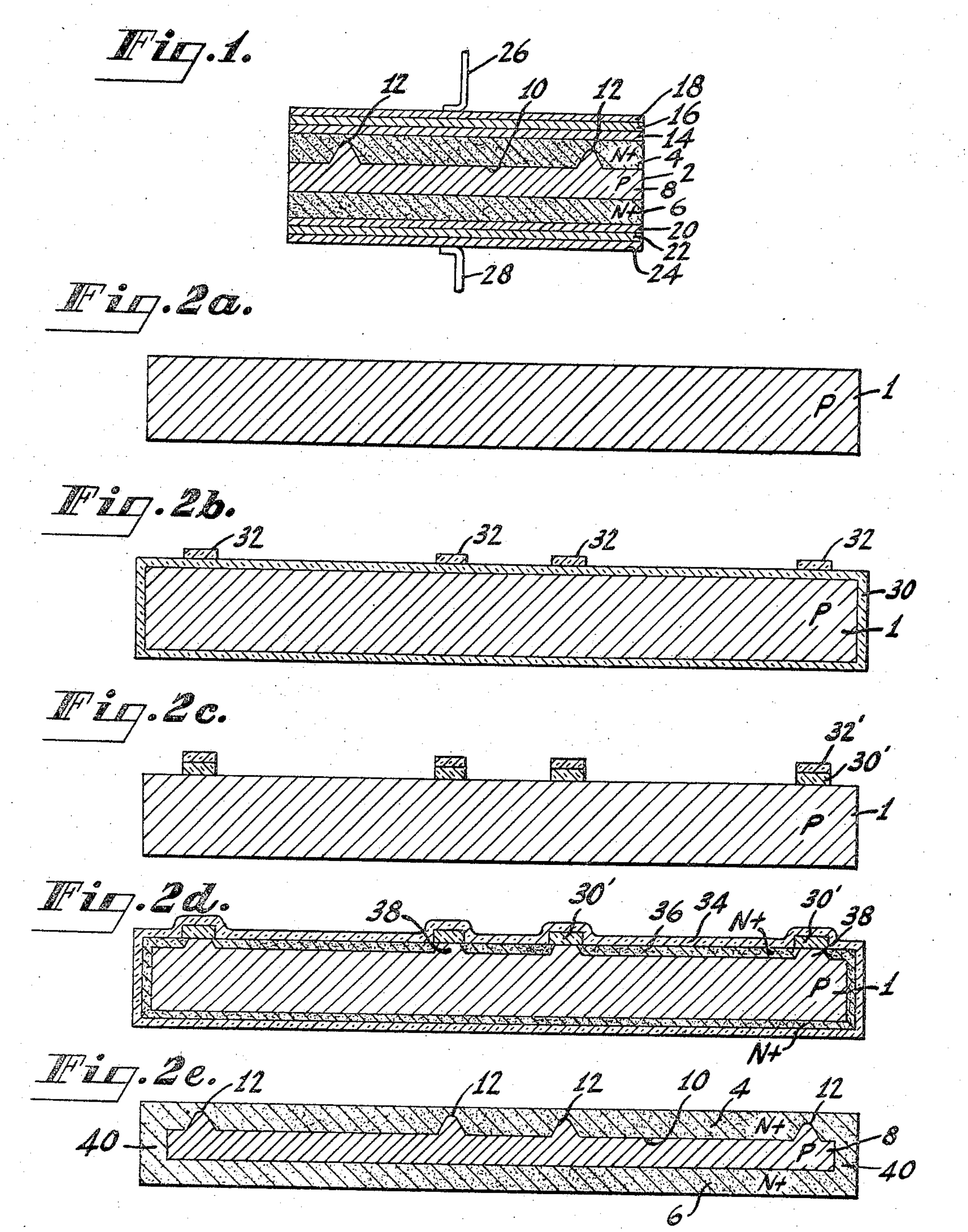
FIGURE 1 is a cross section view of one embodiment of a device.
FIGURES 2A to 2F are similar cross section views illustrating successive steps in a method of manufacturing the device of FIGURE 1.

Referring now to FIGURE 1, a typical device comprises a silicon semiconductor body 2 having an upper $N^+$ outer region 4 and a lower $N^+$ outer region 6 separated by a lightly-doped P type intermediate region 8. The upper $N^+$ region 4 is separated from the intermediate region 8 by a PN junction 10 and is of substantially uniform thickness except that in certain minor portions 12 the region 4 is relatively much thinner than the remainder of the region. The device has at least one such regional portion of reduced thickness but may have several.

The outer surface of the region 4 has three metal layers thereon and the outer surface of the lower region 6 has three similar layers. Immediately adjacent the outer surface of $N^+$ region 4 is a layer 14 which consists of nickel alloyed with silicon. Superimposed on the layer 14 is a layer 16 of nickel, and a layer of lead 18 covers the nickel layer 16. Similarly, the other $N^+$ region 6 is covered with successive layers of alloyed nickel 20, nickel 22 and lead 24. These metal layers are for making good readily solderable ohmic connections to the $N^+$ regions 4 and 6. Metal lead wires 26 and 28 are soldered to the lead layers 18 and 24, respectively.

A typical device, as illustrated in FIGURE 1, may be manufactured as follows: Referring to FIGURE 2A, the starting body may be a P-type silicon wafer 1 having a thickness of about 5½ to 6 mils and a resistivity of about 0.1 to 0.2 ohm centimeters. All surfaces of this wafer have a silicon dioxide film 30 grown or deposited thereon by conventional methods, as illustrated in FIGURE 2B. This film is about 20,000 A. in thickness, but it could be as thin as 2,000 or 3,000 A.

As also shown in FIGURE 2B, small dots of photoresist 32 are laid down by conventional techniques on the top surface of the silicon dioxide film 30. These dots may be, for example, about 2 to 5 mils in diameter and positioned on 20 mil centers. They may be located in random pattern but so spaced that there will be about 2 to 4 dots per finished device pellet. They may be deposited by first coating the entire upper surface of the silicon dioxide layer with a conventional photoresist and then exposing the photoresist through a master film having clear areas wherever the dots are desired, and finally washing off the unhardened photoresist which was not exposed to light.

The next step is to etch off all of the silicon dioxide film 30 except where it is protected by the hardened photoresist 32, leaving the two-layered dots each composed of a bottom layer 30′ of silicon oxide and a top layer 32′ of photoresist, as illustrated in FIGURE 2C. The etching solution may be an aqueous solution of hydrofluoric acid.

The next step is for the purpose of forming a heavily-doped N-type layer adjacent the upper and lower surfaces of the silicon pellet 1. First, the layer of photoresist 32′ is removed from the top of the silicon dioxide lower layer 30′ of each masking dot. The wafer is then placed in a furnace and $POCl_3$ vapor is passed through the furnace. The $POCl_3$ is decomposed to deposit a layer of phosphorous 34 on all surfaces of the wafer. At the same time as the phosphorous film is deposited the silicon pellet is heated for one-half hour at 1200° C. in order to diffuse phosphorous doping material into the silicon pellet, forming a thin doped layer 36 as illustrated in FIGURE 2D. The layer 36 is continuous except for undoped portions 38 beneath the protective dots 30′.

The dots 30′ and the surface layer of phosphorous 34 are then removed from the surface of the silicon wafer and the silicon wafer is heated in a furnace at about 1265° C. for about 40 hours in order to drive the phosphorous of the layer 36 deeper into the silicon pellet. As shown in FIGURE 2E this forms $N^+$ layer 4 adjacent the top surface of the pellet and $N^+$ layer 6 adjacent the bottom surface of the pellet. These layers 4 and 6 become doped to saturation and have about $10^{21}$ impurity atoms/cc. This very high degree of doping is not critical, however. The doping level merely needs to be substantially higher than that of the intermediate layer. A layer 40 adjacent the periphery of the pellet is also doped with phosphorous but this portion of the wafer is later discarded. During this step of the process, the phosphorous doping material also diffuses laterally so that the undoped portions 38 which were underlying the protective dots 30′ are now partially doped in a very thin layer next to the top surface of the wafer, thus forming very thin $N^+$ doped portions 12. A central P type region 8 remains unchanged in the wafer.

Figure 2F:
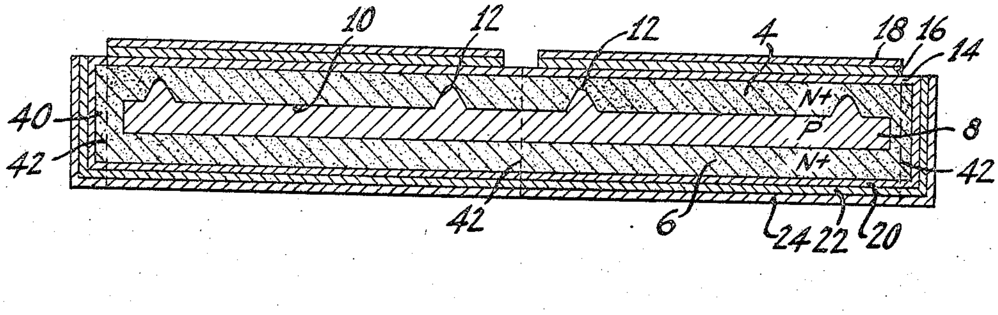

After the phosphorous diffusion is complete, the entire wafer surface is given a thin coating of nickel 14 (FIGURE 2F) by any conventional process. This may either be by electroless or electrolytic techniques. After deposition, the nickel layer is sintered to alloy the nickel into the silicon and thus obtain better adhesion to the silicon wafer.

The next step is to mask out certain areas of the top surface of the wafer and deposit a second layer 16 of nickel in circular areas, each of which includes at least one of the thin $N^+$ portions 12. The nickel also deposits on the edges and bottom of the wafer. This second nickel deposition may also be done by conventional electroless or electrolytic techniques.

The wafer is then dipped in a bath of lead which causes a coating of lead 18 to deposit only on those areas covered by the second layer of nickel 16.

Next, the wafer is diced into separate device pellets by scribing or etching through the wafer in the spaces not covered by the second nickel coating 16 and lead coating 18. Separation lines have been indicated in FIGURE 2F by dotted lines 42. At this time the edge portions of the wafer are discarded.

The device is completed by soldering lead wires 26 and 28 to the top and bottom surfaces (FIGURE 1), respectively, of the pellet.

Figure 3:
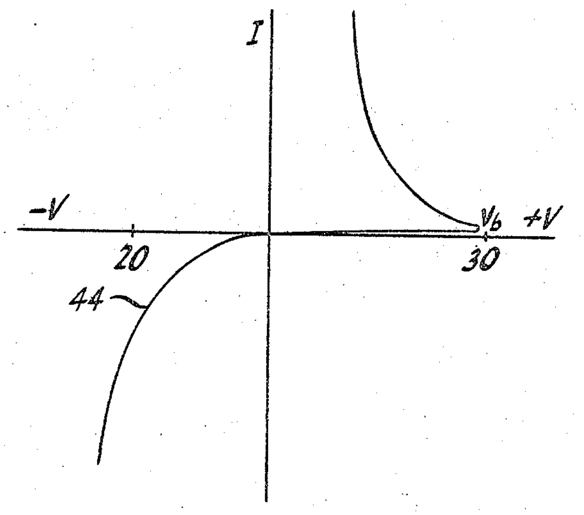
FIGURE 3 is a typical current-voltage characteristic of the device of FIGURE 1.

A V–I characteristic of the device is shown in FIGURE 3 and operation of the device is as follows. When connected in an A-C circuit and as the P-N junction 10 is forward biased, the diode is substantially non-conducting as the voltage across the diode rises, until a certain breakover voltage, $V_b$, is reached. When this breakover voltage is exceeded, the voltage across the diode suddenly drops to a lower level and current through the diode increases sharply. That is, the device exhibits a negative resistance characteristic. In a preferred form of the device, the breakover voltage is about 30 volts, although 30–50 volts is satisfactory. The drop in voltage from the high impedance state to the initial low impedance state is about 6 volts at about 1 milliamp of current.

The breakover voltage can be adjusted by adjusting the resistivity of the base (intermediate layer 8) and the width of the base between the two P-N junctions. It is preferred to keep the base resistivity between about 0.1 and 0.2 ohm cm. If the base resistivity is decreased, breakover voltage is decreased. It is desirable to keep the breakover voltage as low as possible, but this must be done while still retaining a good negative resistance characteristic. If the breakover voltage is reduced to too low a value, the negative resistance characteristic is lost.

A further desirable characteristic is to have the change in switching voltage from the high impedance state to the low impedance state as great as possible. Again this can be adjusted by tailoring the electrical characteristics of the base. One way to increase the switching voltage difference is to raise the lifetime of the charge carriers by slow cooling when the semiconductor body is first prepared.

An important feature of the present device is the effect of the thin portions 12 of the upper region 4 on the V–I characteristic when the device is biased in the reverse direction. If these relatively thin portions were not present, the device would be bi-directional and symmetrical. That is, it would have essentially the same negative resistance characteristic in both directions. This type of reverse characteristic has been found to be disadvantageous if the device is to be used in an SCR trigger circuit of the type which was previously mentioned. A negative resistance characteristic in the reverse direction has a tendency to cause generation of a series of SCR gate pulses when the SCR is in reverse bias. This occurs because the SCR does not turn on in the reverse direction and, therefore, keeps re-charging the gate capacitor, generating additional pulses. This condition is undesirable because, after this series of pulses, the gate capacitor voltage is not well defined, so the firing angle of the SCR may wander or change abruptly, rather than gradually as the potentiometer resistance is changed.

However, in the present device, the presence of the thin outer region portions reduces the breakover voltage sufficiently so that there is no negative resistance region when the device is reverse biased. In an embodiment, made as taught in the preceding example, the knee 44 of the curve in the 3rd quadrant occurs at about 20 volts, or about 10 volts lower than the breakdown voltage in the forward direction. If the number of thin portions is increased, the reverse breakdown voltage can be lowered still further but the number should preferably not be increased to occupy an area greater than about 25% of the total area of the region.

Asymmetric diodes fabricated as described above have been found to have the advantages previously mentioned as being desirable for trigger circuits. For a given breakover voltage, the semiconductor diode can be made with greater change in voltage between the high impedance state and the low impedance state than a neon bulb. It has also been found that diodes made as described herein can be designed with lower breakover voltages thus permitting the use of lower voltage trigger circuit components with a further reduction in cost.

Another advantage is the difference in size between the diode of the present invention and a neon bulb. Even if the diode is placed in a separate container, it occupies much less space than the smallest size neon bulb which is practical to use. But further savings in space can be achieved by mounting the triggering diode in the same container with the SCR.

The diodes of the present invention are not affected by factors such as ambient light or nearby electric fields as are neon bulbs, so that the use of triggering diodes rather than neon bulbs in triggering circuits permits much more stable operation of the circuit.

Although an $N^+PN^+$ device has been illustrated and described in the example, the N type zones can be less highly doped than in the example and the device can also be made in the PNP configuration.

Various changes are possible in the technique of manufacturing the diodes of the present invention. In the working example which has been given, the $N^+$ zones and the thin regions in one of these zones have been introduced by using a single phosphorous diffusion with carefully controlled diffusion time and temperature. The conditions were such that closure of the open spaces 38 in the top $N^+$ region was just accomplished. But it is also possible to leave these regions unclosed in the first diffusion and then carry out a second diffusion introducing more phosphorous on the top surface and diffusing in just enough to provide the thin portions 12 of desired thickness.

Although silicon was the semiconductor in the example, other semiconductors such as germanium or one of the III–V compounds, such as gallium arsenide, may be used. Also, the ohmic electrodes may be made using various other metals, such as gold, for example. The nickel layers described are not critical to successful device operation.

What is claimed is:

1. An asymmetrically conducting semiconductor diode comprising:

a body of semiconductor material including two outer regions of one type conductivity, and an intermediate uniformly doped region of opposite type conductivity, P-N junctions between said outer regions and said intermediate region, said outer regions being doped more heavily than said intermediate region, one of said outer regions having a major portion of substantially uniform thickness and at least one minor portion which is relatively much thinner than said major portion, said intermediate region being relatively thicker where said one outer region is thinner, an ohmic electrode attached to both said major and minor portions, and an ohmic electrode attached to the other one of said outer regions.

2. A device according to claim 1 in which said minor portion occupies an area of less than 25% of the total area of said one region.

3. A device according to claim 1 in which said intermediate region is lightly doped and said outer regions are very heavily dope.

4. A device according to claim 1 in which said intermediate region has a resistivity of about 0.1 to 0.2 ohm cm. and said outer regions are doped substantially to saturation.

References Cited

UNITED STATES PATENTS

| | | | |
|---|---|---|---|
| 3,140,438 | 7/1964 | Shockley et al. | 323—22 |
| 3,196,329 | 7/1965 | Cook et al. | 317—234 |
| 3,222,530 | 12/1965 | Kalhammer | 250—211 |

JOHN W. HUCKERT, *Primary Examiner.*

R. SANDLER, *Assistant Examiner.*

U.S. Cl. X.R.

148—189